UNITED STATES PATENT OFFICE.

ROBERT W. LESLEY AND JAMES M. WILLCOX, OF PHILADELPHIA, PA.

MANUFACTURE OF PORTLAND CEMENT.

SPECIFICATION forming part of Letters Patent No. 292,329, dated January 22, 1884.

Application filed December 21, 1883. (No specimens.)

*To all whom it may concern:*

Be it known that we, ROBERT W. LESLEY and JAMES M. WILLCOX, of Philadelphia, in the State of Pennsylvania, have invented a certain new and useful Improvement in the Manufacture of Portland Cement, of which the following is a specification.

The ordinary processes heretofore employed of making Portland cement from hydraulic limestones, cement rocks, clays, chalks, &c., involve considerable labor and expense and consume much time. It is necessary to wait for the drying of the cement-pastes after they are made before calcining them, and the calcining operation itself is tedious and requires to be conducted with great care, the purpose of this operation being not only the clinkering or semi-vitrifying of the cement-paste, but the expulsion both of the carbonic-acid gas and water found in the raw material and of the water put with the cement-powder in order to form it into paste, which, to a considerable extent, remains in the paste as it is put in the kiln. Moreover, in the calcining operation a large portion of the cement-paste is wasted by underburning or overburning, this being due to the impediment in the draft and the choking up of the kiln produced by the compactness of straight-surfaced materials and the running together of the adjacent square or flat pieces or blocks into which the cement-paste is usually formed before being placed in the kiln. The length of time required for calcining depends largely upon the amount of water or moisture in the cement-paste, and with a view, among other things, to reduce this amount, as well as to remove the carbonic-acid gas, the plan has been adopted of first calcining the raw stone by slow heat and then grinding it, forming it into cement-paste, and recalcining the same to a clinker, as described in Letters Patent No. 279,357, of June 12, 1883. This process gets rid of the moisture and carbonic-acid gas contained in the raw material, but does not obviate the necessity for the mixing of the usual amount of water with the cement-powder in order to make the same into paste. For the purpose of obviating the necessity of waiting for the paste to dry, and of saving the labor and expense usually attending the treatment and handling of the paste after it leaves the pug-mill and before it is put into the kiln, the plan has been adopted of mixing with the paste a liquid combustible, as described in Letters Patent No. 274,288, of March 20, 1883, whereby the cement-paste can be put into the kiln and subjected to calcination while wet or damp. These processes get rid of the gas and water in the raw stone or material before it is ground into powder, and the latter permits the paste to be subjected to calcining heat while still wet; but neither of them removes the necessity for the employment of water in considerable quantity mixed with the cement-powder for the purpose of bringing the latter to the condition of paste, which can be formed into proper shapes.

Our invention has to do with the step last named; and its object is to mold cement-powder into forms or shapes suitable for the kiln as respects size, adaptability to free draft, &c., while dispensing nearly, if not altogether, with the water ordinarily required to put it into pasty condition for this purpose. In other words, we propose to fit for calcination balls or lumps of dampened cement-powder mechanically compressed by force, instead of masses of wet cement-paste cut or molded according to methods heretofore used. We find that under our process the amount of water necessary is reduced from thirty-five to forty per cent., by weight, (the amount heretofore required,) to about six to ten per cent., by weight, where ground raw stones or cement-making materials are used, and to about fifteen to twenty-five per cent., by weight, where calcined cement-making powder is similarly used.

We have discovered that the object we have in view can be accomplished by compressing the cement-making powder while simply dampened, but not in a pasty condition, between rollers whose surfaces are indented with cells wherein the dampened powder may, under pressure, be molded into forms suitable to be placed into the kiln. Mechanism suitable for carrying out this compressing operation is described in Letters Patent No. 167,913; but other suitable machinery or apparatus may be employed.

One way of carrying our invention into practice is to take raw cement-rocks, such as are used for making Portland cement, and, after grinding them into powder in the ordinary way between millstones, run the powdered mass into a mixer of any approved form, wherein we add to the powder about three (3) per cent., by weight, of coal-tar, or other liquid combustible, and only about eight per cent., by weight, of water. The powder is well stirred, and while in this pulverulent condition is fed in between rolls having upon their faces egg-shaped, hexagonal, circular, or other formed cavities or cells, wherein the dampened powder is compressed into balls or lumps most suitable for the calcining operation. These balls or lumps may then be conveyed upon an endless belt, or by any other suitable device, to a kiln, where they are calcined, and thence removed to mills, where they are ground into finished cement.

Another way of using our invention is to take limestone and clay, or chalk and clay, as commonly used in the manufacture of Portland cement, dry the same, and grind them together in mills. The powder thus obtained is conveyed to a mixing or stirring machine of any suitable design. To the powder about twelve per cent. of water, by weight, is added. The dampened powder thus obtained is fed between rotating surfaces of the character above described, and the balls or lumps obtained by the molding operation are conveyed to kilns, and then ground into finished cement. We have also made Portland cement by taking natural cement-rocks containing the proper cement elements, calcining them with about the same degree of heat usually required to make the ordinary natural cement known in the trade, and then grinding the material thus obtained to a powder. This powder is then run into a mixing or stirring machine of any suitable design, and about twenty per cent. of water, by weight, and four per cent. of any liquid combustible are then stirred into it, (together with about one per cent., by weight, of coke "breeze.") The dampened powder thus obtained is then fed between rotating surfaces or rolls, into the faces of which are sunk egg-shaped, hexagonal, circular, or other shaped cavities or cells, wherein the material is compressed and molded into balls or lumps most suitable for burning in the kiln. They are then conveyed by an endless belt or any other suitable device to kilns, where they are calcined, and afterward ground into finished cement in the usual way. We do not, however, limit ourselves to these applications of our discovery, which are merely adduced by way of illustration of how it may be used. In every case, however, there should be employed the main features of our process, to wit: simply dampening the pulverulent cement-making material, so that it shall remain essentially powder, as contradistinguished from paste, and then forming this dampened powder into balls or lumps by hard pressure, preferably between rotating surfaces.

We have found by practical experience that our invention possesses many advantages over the systems now in use for making Portland cement, and for preparing the cement-making composition for the same.

First. By it a minimum of water is required. In most cases when the raw materials are used only about one fourth of the water heretofore used is required, thus effecting a great saving in the fuel necessary for the drying and calcining of the paste in the ordinary process, and furthermore insuring a quicker and more economical burning in the kilns, since a considerable portion of such minimum of water is pressed from the balls or lumps by pressure, to which they are subjected in passing through between the rolls, and is further evaporated during passage of the balls or lumps from the rolls to the kilns.

Second. The oviform, globular, or hexagonal balls or lumps, into which we preferably mold the cement-making powder, cannot be successfully and regularly produced in any other way than by hard pressure, and they possess, by reason of their small size and shape, advantages over the square flat-sided pieces or slabs into which cement-pastes have hitherto been formed, since they admit of a free circulation of air during the calcining operation, do not clog the draft, have no corners to chip off and "dust" away, admit of a freer and more perfect burning than is attainable under the older methods; and, furthermore, are easier to crush and grind than the large pieces made under the older methods.

Third. The balls or lumps, being all molded by a uniform pressure, possess a uniformity of porosity and density and dampness, and consequently we are enabled to obtain a more uniform manufactured product.

Fourth. There is a doing away with the settling tanks or "backs" and drying-floors required under the older methods, owing to the fact that by our process the cement lumps in desirable forms can be delivered directly from the molding-machine to the kilns by endless belts or other similar devices without handling whatever, whereby is effected a large saving in the cost of manufacture, while the great capacity of rolls over other designs of compressing-machines enables larger amounts of the cement lumps or balls to be economically prepared for the calcining operation.

What we claim, and desire to secure by Letters Patent, is—

1. The hereinbefore-described improvement in the art of manufacturing Portland cement, consisting in dampening only the pulverulent cement-making material, so that it shall still remain essentially powder, as contradistinguished from paste, and then molding said dampened powder into balls or lumps by hard pressure between rotating surfaces, substantially as and for the purposes hereinbefore set forth.

2. The process of manufacturing Portland cement, consisting in reducing the cement-making material to powdered condition, dampening the same to such an extent only that it shall remain essentially powder, as contradistinguished from paste, molding said dampened powder into balls or lumps by hard pressure, and subsequently calcining said balls or lumps and reducing them to powder, substantially as and for the purposes hereinbefore set forth.

In testimony whereof we have hereunto set our hands this 20th day of December, 1883.

R. W. LESLEY.
    JAS. M. WILLCOX.

Witnesses:
 E. A. DICK,
 J. WALTER BLANDFORD.